No. 653,181. Patented July 3, 1900.
H. M. QUICK.
RUNNING GEAR FOR AUTOMOBILES.
(Application filed Aug. 11, 1899.)
(No Model.)
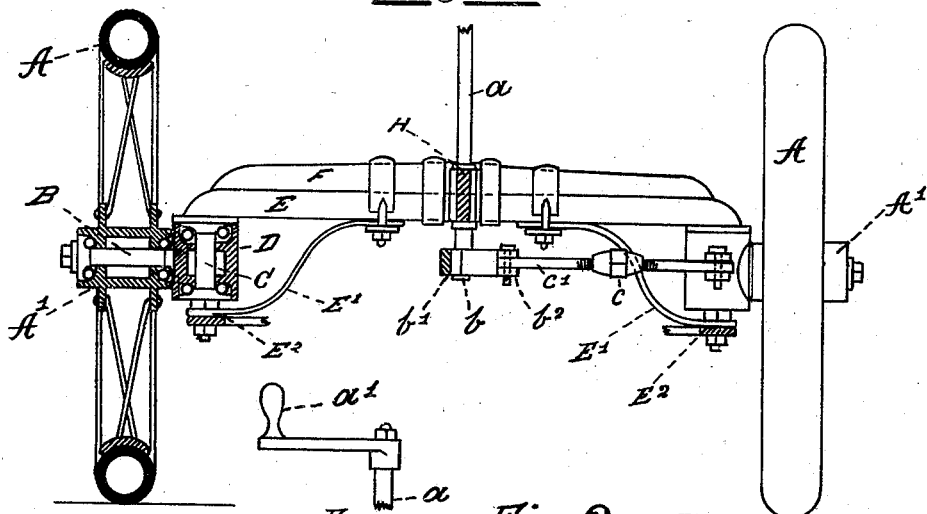
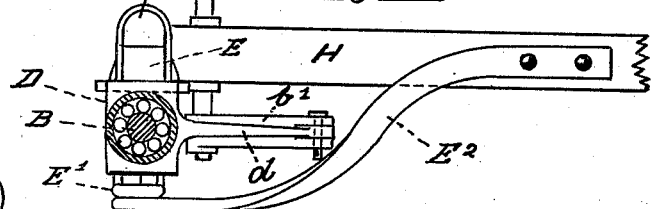
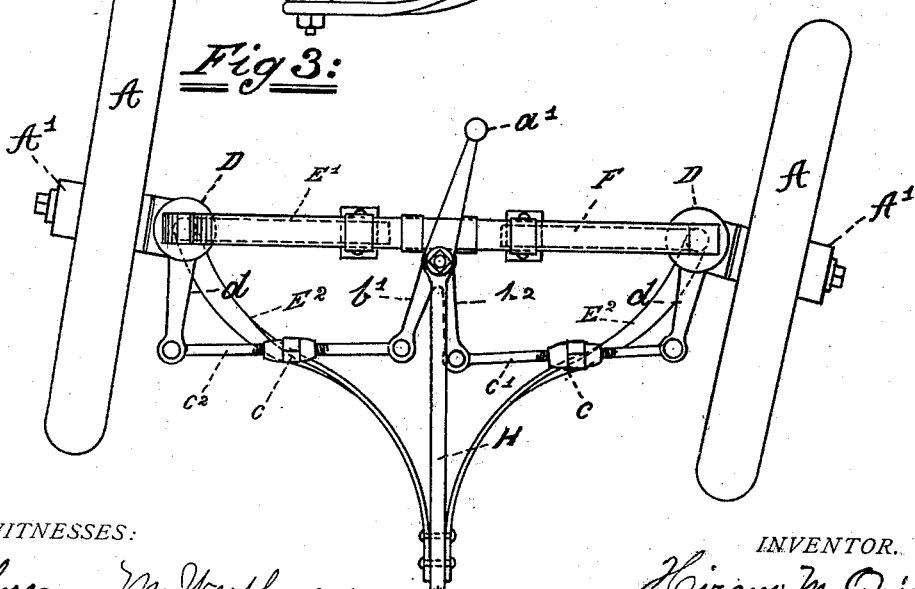
WITNESSES:
Florence M. Westhoven.
I. F. Boice
INVENTOR.
Hiram M. Quick
BY John F. Kerr
ATTORNEY.

UNITED STATES PATENT OFFICE.

HIRAM M. QUICK, OF PATERSON, NEW JERSEY.

RUNNING-GEAR FOR AUTOMOBILES.

SPECIFICATION forming part of Letters Patent No. 653,181, dated July 3, 1900.

Application filed August 11, 1899. Serial No. 726,876. (No model.)

*To all whom it may concern:*

Be it known that I, HIRAM M. QUICK, a citizen of the United States, residing at Paterson, in the county of Passaic and State of New Jersey, have invented certain new and useful Improvements in Running-Gear for Automobiles and other Vehicles, of which the following is a specification, reference being had therein to the accompanying drawings.

The object of my invention is to provide a running-gear for vehicles in general, but which relates more particularly to that class of vehicles known as "motor-vehicles" or "automobiles," which running-gear, by reason of its simplicity and ease of operation, will greatly facilitate the movements of the vehicle and add to the durability thereof.

The invention consists in a novel construction, arrangement, and combination of the various parts, which will be hereinafter described in the specification and pointed out in the claim and which are shown in the accompanying drawings, which form a part of this specification and in which similar letters of reference indicate like parts.

Figure 1 of the drawings is an elevation, part sectional, of the front-axle wheels and steering apparatus of my motor-vehicle or automobile. Fig. 2 is a side view, part sectional, of a portion of the same, showing the steering apparatus with the arm and ball-bearing hub of the wheel in section; and Fig. 3 is a plan view showing the front axle and wheels and steering apparatus which comprise my invention, the wheels being swiveled and for turning, illustrating the method of turning the wagon in any direction or at any angle required.

In the drawings, E represents my improved axle, which is provided with the arms C, F being the bolster of axle and H the reach, E' being braces secured to the axle and E² being braces secured to the reach. The braces E' connect the axle-arms C and the axle E, while the braces E² connect the axle-arm C and the reach H. The wheel A has a ball-bearing hub A' and has for its axle the arm B, which is constructed integral with and forms a portion of the ball-bearing hub D, which rotates on the angle-arm C or downwardly-projecting portion of the axle E. Said ball-bearing hub D is provided with a cranking lever $d$, which is also constructed integral therewith. A bifurcated lever $b$ is secured to an upright guide-rod $a$, which passes pivotally through the frame of running-gear and into or near the body of vehicle and is provided at the upper end with a steering-handle $a'$. The bifurcated lever $b$ has the arms right and left, which are indicated as $b'$ and $b^2$. The ends of arms $b'$ and $b^2$ are connected with the lever-arms $d$ $d$ by means of the adjusting-rods $c'$ and $c^2$ and the turnbuckles $c$ $c$.

The operation of steering my improved motor-vehicle is simple and entails but little friction upon the running-gear, the axle being stationary and the axle-arm and the wheel-arm both being provided with ball-bearing hubs. In both hubs the balls are contained by and held in an annular chamber or chambers provided for that purpose and which are constructed in the ordinary manner. In the drawings the arms C of the axle E are shown as being bent downwardly in combination with my combined ball-bearing axle-hub and wheel-axle. The axle may be bent in other directions than as shown. The drawings show but one reach; but I propose to use two when desirable. When the pivoted bifurcated lever $b$ is pointing at right angles to the axle E, it is an indication that the wheels A A are parallel with each other and the vehicle is going in a straight direction. When said bifurcated lever is thus crossing the axle E at right angles and at no other time are the wheels A A paralleling each other or is the vehicle going in a straight course. Said bifurcated lever may be kept thus crossing the axle E and at right angles thereto by the hand of the operator or by any other suitable mechanical means.

In Fig. 3 of the drawings the steering apparatus indicates that the handle has been turned toward the right in order that the vehicle may turn in that direction, and as the axle is stationary and the wheels only are turned the right wheel A is turned out of parallel with the left wheel A, the left wheel A being compelled to describe a larger circle in turning than the right wheel A, which is vice versa when the steering-handle is turned to the left of the center or pivot on which the bifurcated lever turns. In the latter case the left wheel would describe the smaller circle and the right wheel the larger circle. This turning of the wheels out of parallel with each other is an additional safeguard against friction and reduces the wearing of the bearing portions of the running-gear and prevents the wheels from sliding sidewise if turned while the vehicle is in motion.

With this description of my invention what I claim is—

The combination with a bolster, of an axle having its ends bent downwardly at right angles, forming spindles integral therewith, each of its spindles being provided with an integral shoulder, the lower face thereof being partly beveled, a hub having a horizontal lever and a horizontal spindle both integral therewith, mounted to rotate on said axle-spindle and provided with two ball-raceways, one at the upper and one at the lower portion thereof, an adjustable ring and ball-bearing beveled on its upper face adapted to fit on said axle-spindle and under said hub, means for supporting said adjustable ring and hub on said axle-spindle and balls located in the raceways of said hub, a steering-handle and connections between said steering-handle and said horizontal lever, substantially as set forth.

In testimony whereof I affix my signature in presence of two witnesses.

HIRAM M. QUICK.

Witnesses:
FLORENCE M. WESTHOVEN,
JOHN F. KERR.